June 21, 1949.  J. A. PICKARD  2,474,161
LUBRICATING OIL FILTER
Filed June 1, 1944  3 Sheets-Sheet 1

Inventor
Joseph Allen Pickard

June 21, 1949.  J. A. PICKARD  2,474,161
LUBRICATING OIL FILTER

Filed June 1, 1944  3 Sheets-Sheet 3

Patented June 21, 1949

2,474,161

UNITED STATES PATENT OFFICE 2,474,161

LUBRICATING OIL FILTER

Joseph Allen Pickard, Acton, London, England, assignor to The Metafiltration Company Limited, Hounslow, England, a company of Great Britain and Northern Ireland Application June 1, 1944, Serial No. 538,283
In Great Britain April 3, 1943

2 Claims. (Cl. 210—181)

This invention relates to lubricating oil filters and particularly filters adapted for use with, or associated with, internal combustion engines.

The filters associated with engines, and particularly internal combustion engines, operate only during the running of the engine and they depend upon a lubricating oil pump for the pressure necessary to force the oil through them.

As soon as the pump ceases operation, the pressure falls and filtration stops, which is of great disadvantage in the case of engines employed for short runs, as the operation of the filter only begins to be effective in cleaning the oil after the oil in the filter has itself become warm, and this does not usually take place until the engine has been running for some relatively considerable time.

Proposals have been made for warming up such filters by the exhaust from the engine or by the heat of the water employed for cooling the engine, in the case of internal combustion engines, but this has not found favour and in any case would be subject to some limitation as the filter can only purify the oil so long as the engine, and therefore the pump, is running.

According to the invention, between the delivery of the pump and the filter there is included a non-return valve and with the filter there is associated an air chamber in which the level of the oil delivered by the pump will rise, thus building up pressure in the air chamber and in the filter until the air pressure is equal to the pressure in other parts of the lubricating system, so that on interruption of the operation of the pump the pressure in the air chamber and above the surface of the oil therein will be operative to force the oil through the filter.

The air chamber may be wholly or partly external to the filter chamber, being arranged at a position between the non-return valve in question and the inlet to the filter, or it may be constituted by a space in the filter chamber itself located at a position above the filter elements therein, or the air chamber may be constituted by an additional member external to the filter chamber and a proportion of the space within the chamber containing the filter elements and positioned above them.

The invention consists particularly in a filter comprising a chamber in which the filter elements are located, an inlet to the chamber for the liquid to be filtered and within the chamber at the upper portion thereof a space adapted to provide an air chamber above the level of the filtering elements and an outlet from the chamber for the filtered liquid opening into the filter chamber at a position below the level of the air chamber.

The filter may be of any appropriate form. It may be of the edge filtration type or it may be a filter in which the filtering elements are constituted by a plurality of relatively thin annular cells having porous walls located about a central drainage or delivery element.

With a filter system in accordance with the invention, every time the engine is started and run, even for a minute or two, a considerable amount of filtered oil must be returned to the engine, the amount depending on the size of the air chamber fitted.

If the engine is run for a considerable time, the operation of the filter is much the same as it would be without the air chamber, but even in this case there may be some advantage from the initial high pressure developed when the oil is cold, as this will not now fall off when the oil in the engine is warm but the oil in the filter has not yet warmed up.

The invention will be described further in detail and by way of example with reference to the accompanying drawings, in which—

Figure 1:
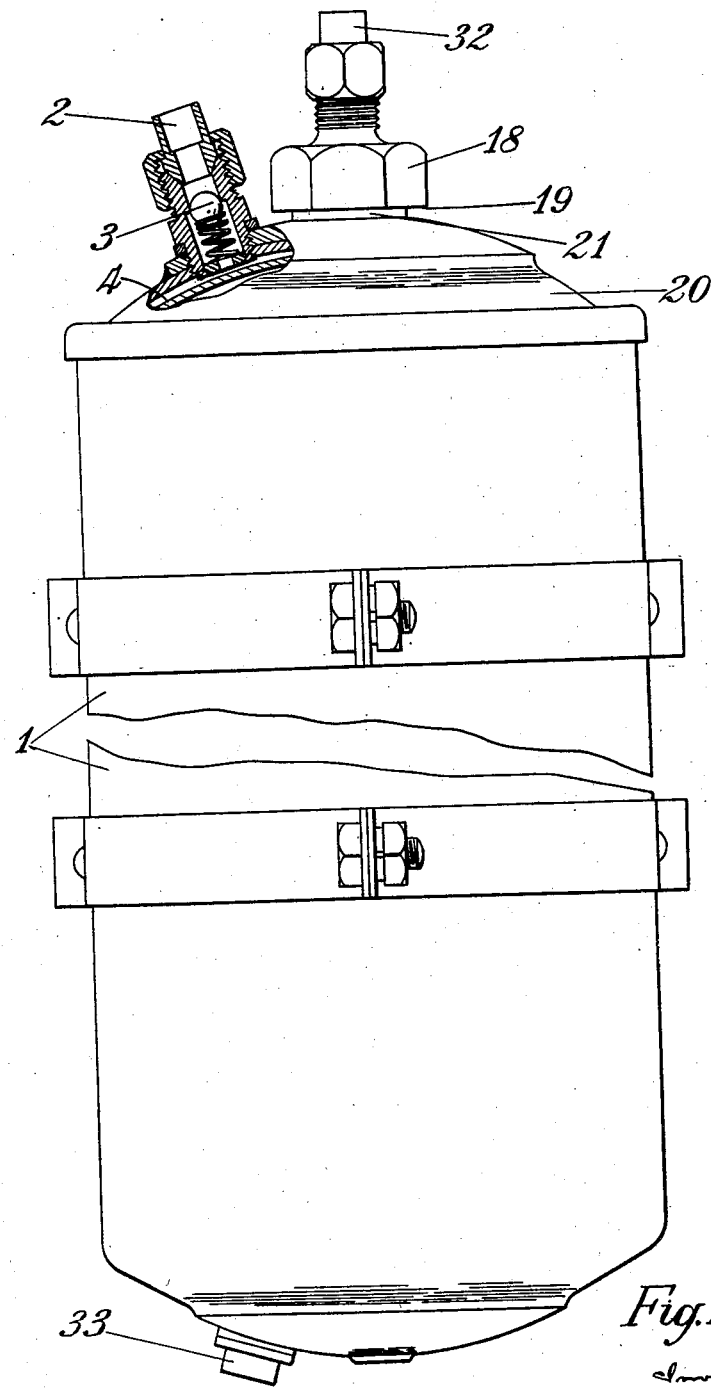
Figure 1 is a view in elevation partly in section.
Figure 2:
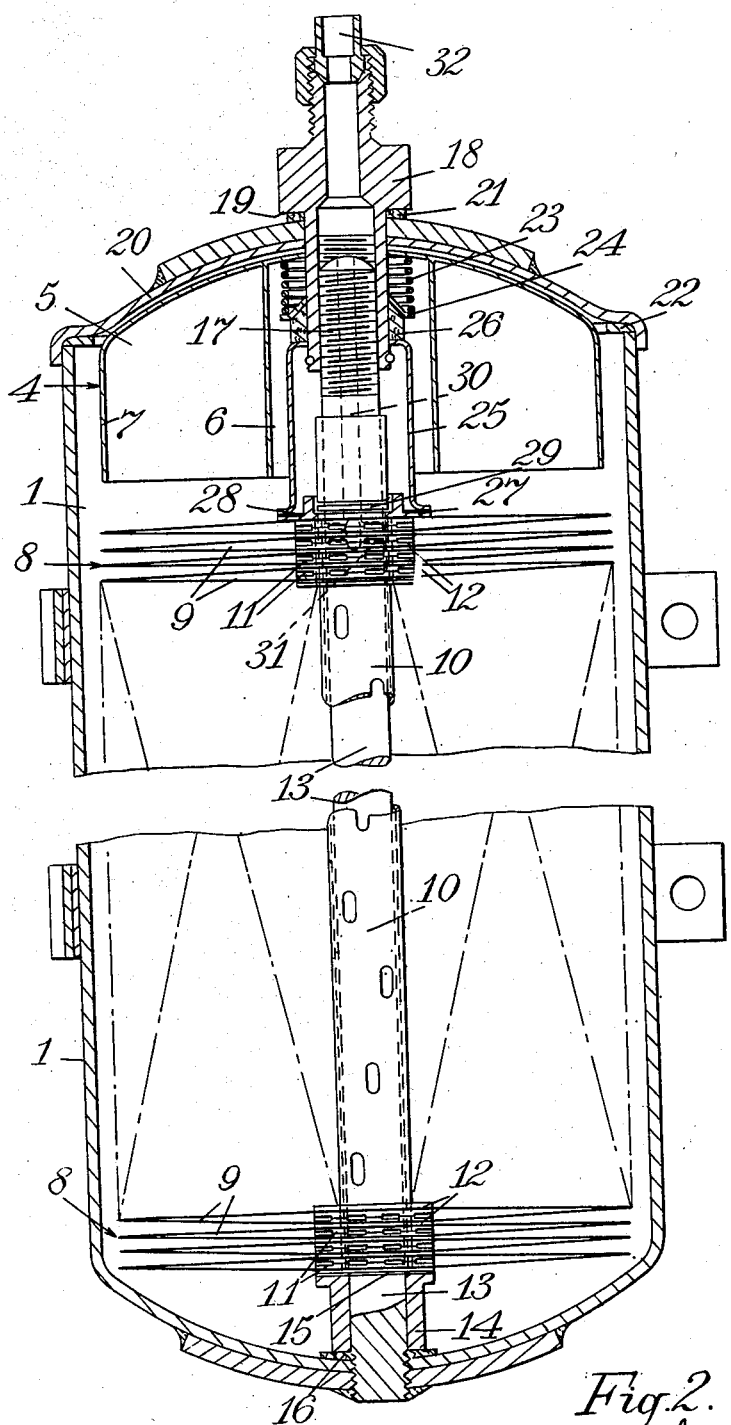
Figure 2 is a sectional elevation.

The drawings illustrate constructions in which the air chamber is constituted by a space in the filter chamber itself, and in Figures 1 and 2, 1 is the filter chamber, 2 the inlet thereto, 3 a non-return valve associated with the inlet, 4 being a bell-shaped member providing an air chamber 5 between inner and outer walls 6 and 7 located above the filter elements 8 which are in the form of a plurality of relatively thin annular cells 9 of known construction located about a drainage element 10 having channelled washers 11 within each cell chamber adapted to permit liquid to pass to the drainage element and further unchannelled washers 12 between adjacent cells.

The central drainage element 10 is in the form of a perforated tube surrounding a rod 13 rigidly engaged in the base of the filter chamber and having about it a collar 14 forming an abutment for the lowermost of the aforesaid unchanneled washers associated with the plurality of cells.

A paper washer 15 is interposed between it and the lowermost unchanneled washer in question and a joint ring 16 is provided between its lower end and the base of the chamber 1.

The upper end of the rod is provided with a screw-threaded portion 17 engaging a screw-threaded element 18 furnished with a shoulder 19 between which and the cover 20 of the chamber is a washer 21.

Below the cover of the filter chamber which is arranged to seat upon a jointing ring 22, there is provided a spring 23 which bears upon a metal disc 24, between which and a bell shaped element 25 there is located a felt washer 26.

The lower edge of the element 25 is seated on a collar 27 surrounding the drainage element 10. A paper washer 28 is provided between the lower edge of the bell and the collar 27, and the latter is seated on top of the assemblage of filter cells 8. The spring 23 operates to force the collar 27 against the assemblage of the filter cells to maintain them in liquid-tight contact one with the other. The collar 27 is maintained in fluid-tight engagement with the upper portion of the drainage element 10 by means of a sealing ring 29.

The upper end of the rod 13 has an axial bore or channel 30 which extends into the upper portion of the assemblage of filter cells 8 and which communicates by means of a transverse channel or bore 31 with the space between the drainage tube 10 and the rod 13. The filter liquid can therefore flow in series from this space through the channels 31 and 30, the element 18 and an outlet 32. The filter chamber 1, as shown in Fig. 1, is provided with a screw plug 33 to enable the contents of the filter chamber to be emptied when necessary for cleaning and like purposes.

In the operation of the filter unit shown in Figs. 1 and 2, the liquid to be filtered, which, according to a preferred form of the invention is the lubricating oil of an internal combustion engine, is forced by means of an oil pump into the filter unit through the inlet line 2 and the non-return valve 3 provided therein, into the filter chamber 1. The oil in the filter chamber covers the filter elements 8, flows through the filterin material to the inside chambers 9 of these elements, then through the openings in washers 11, into the space between the perforated drainage tube 10 and the tie-rod 13. The oil is filtered in passing through the elements 8, and the filtered oil is conducted through the channels 31 and 30, the element 18, and through the outlet 32 to the parts of the internal combustion engine to be lubricated.

The bell-shaped member 4 mounted in the upper portion of the filter chamber 1, above the assemblage of filtering elements, acts to trap air which is readily compressible. As the pressure builds up in the filter chamber, the air is compressed in the bell 4 as the oil level rises therein. Internal combustion engines, such as those used in automobiles, are usually employed for relatively short runs. When the pressure is built up in the filter chamber 1 by such a run, and the automobile and the oil pump stop, the filtration carried on by the filter unit continues because the non-return valve 3 prevents release of pressure through the line 2, and the built-up air pressure in the bell 4 is available to force oil from the filter chamber. Therefore, after the pump stops, the pressure in the filter chamber is relieved gradually by the flow of filtered oil through the outlet 32, the expansion of the compressed air in the bell 4 serving as the motive force for forcing oil through the filter and through the outlet 32. The parts of the combustion engine which are lubricated by the oil pump are therefore covered with clean filtered oil after the engine stops.

Figure 3:
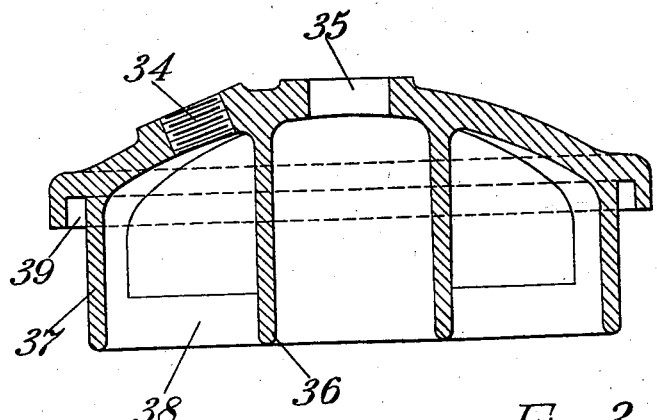
Figures 3 and 4 are respectively views in sectional elevation and plan of a detail of a modified construction.
Figure 4:
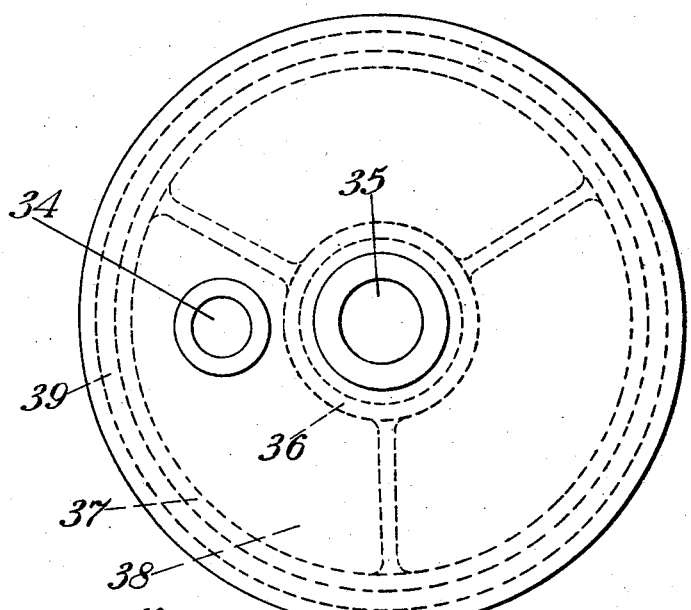
Figure 5:
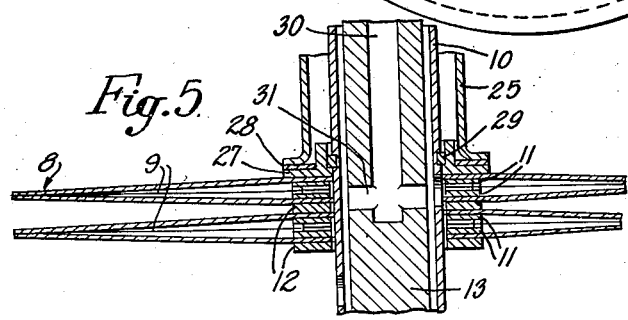
Figure 5 is an enlarged fragmentary view in sectional elevation of a part of the filter system elements as shown in Figure 2.

Referring to Figures 3 and 4 which illustrate a combined bell and cover plate for the filter chamber, 34 is a screw-threaded hole into which the inlet valve may be screwed and 35 is a further hole through which the delivery of the filter will extend while 36 and 37 are internal and external walls leaving a space 38 which will constitute an air chamber, 39 being a recess in the element in which may be engaged a jointing washer for providing a liquid tight joint between the cover illustrated and the body of the filter chamber which may be of the form illustrated in Figures 1 and 2.

I claim:

1. A filter comprising a filter chamber including means defining an open bottomed air chamber in the upper portion thereof, a vertical assemblage of filtering elements mounted in said filter chamber below the level of said air chamber, a central drainage tube extending vertically through said filtering elements and adapted to receive filtered liquid therefrom, means for conducting liquid from said drainage tube at the upper portion of said assemblage of filtering elements, means including a spring arranged in compression between the top inner side of said filter chamber and the top upper side of the uppermost filter element of said assembly of filtering elements for maintaining said assembly in liquid-tight engagement with each other around said drainage tube, an inlet including a non-return valve for introducing all the liquid to be filtered to the filter chamber, and an outlet communicating with said means for conducting liquid from said drainage tube for withdrawing filtered liquid from the filter chamber.

2. A filter comprising a filter chamber including an open bottomed bell-shaped air chamber in the upper portion thereof, a vertical assemblage of filtering elements mounted in said filter chamber below the level of said air chamber, a central drainage tube extending vertically through said filtering elements and providing an outlet for withdrawing filtered liquid and adapted to receive filtered liquid therefrom, means for conducting liquid from said drainage element at the upper portion of said assemblage of filtering elements, an inlet line for the delivery of liquid to be filtered to said filter chamber, said inlet line including a non-return valve through which passes all the liquid entering the filter chamber and which is adapted to prevent reverse flow of liquid, and an outlet line communicating with said central drainage tube for withdrawing filtered liquid from the filter chamber.

JOSEPH ALLEN PICKARD.

REFERENCES CITED

The following references are of record in the file of this patent:

UNITED STATES PATENTS

| Number | Name | Date |
|---|---|---|
| 571,744 | Breyer | Nov. 24, 1896 |
| 630,363 | Krause | Aug. 8, 1899 |
| 685,224 | Schmidt | Oct. 22, 1901 |
| 893,070 | Gobbi | July 14, 1908 |
| 1,750,997 | Feldmeier | Mar. 18, 1930 |
| 1,804,512 | Pickard | May 12, 1931 |
| 1,884,615 | Dooley | Oct. 25, 1932 |
| 1,889,325 | Whaley | Nov. 29, 1932 |
| 1,913,401 | Liddell | June 13, 1933 |
| 1,978,856 | Briggs | Oct. 30, 1934 |
| 2,103,572 | Wells | Dec. 28, 1937 |
| 2,108,798 | Dalrymple | Feb. 22, 1938 |
| 2,134,413 | Munoz | Oct. 25, 1938 |
| 2,352,901 | Klein | July 4, 1944 |